United States Patent Office 3,011,965
Patented Dec. 5, 1961

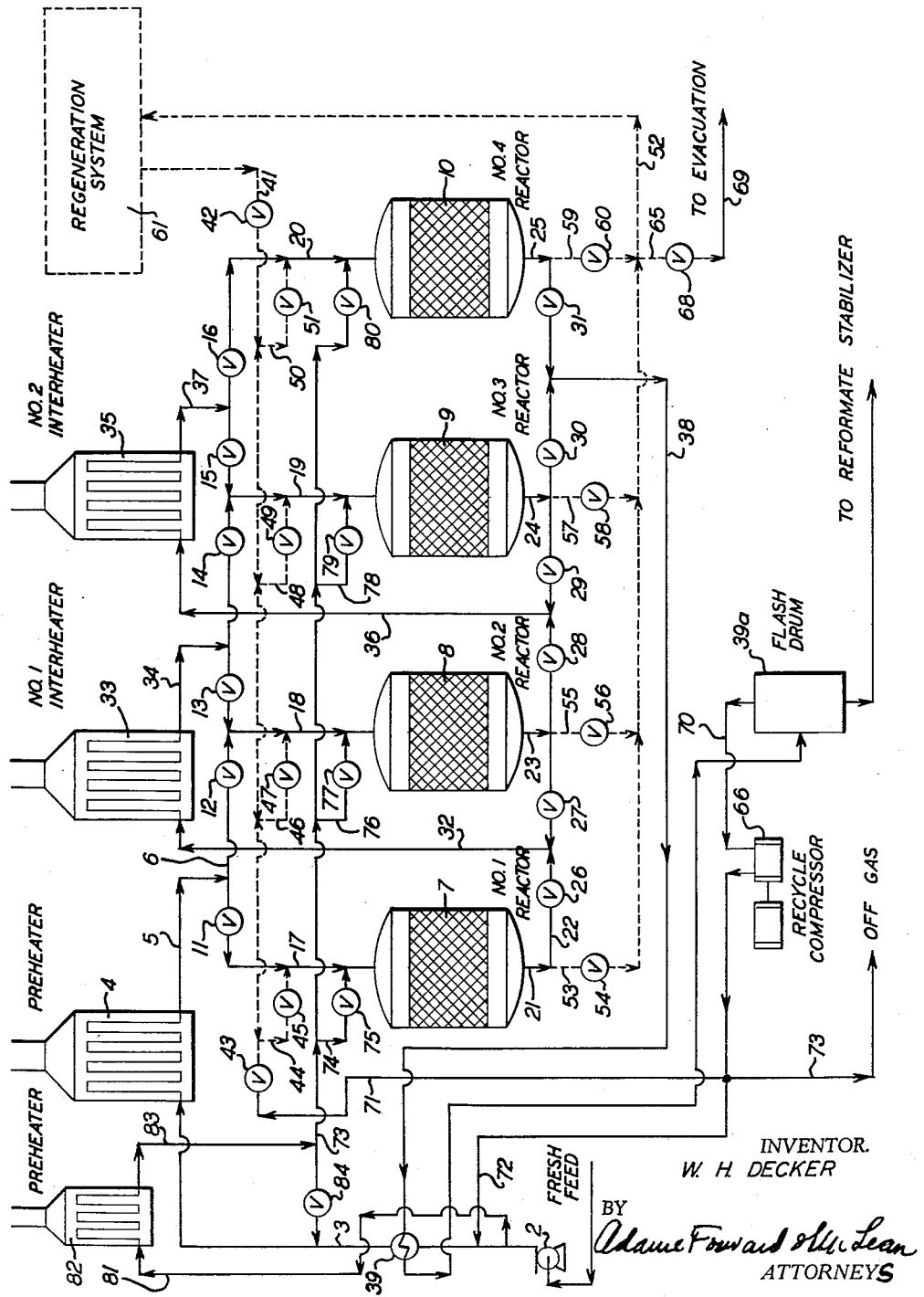

3,011,965
TEMPERATURE STABILIZATION IN A MULTIPLE BED CATALYTIC REFORMING SYSTEM
William H. Decker, Chicago, Ill., assignor to Sinclair Refining Company, New York, N.Y., a corporation of Maine
Filed Mar. 2, 1959, Ser. No. 796,328
7 Claims. (Cl. 208—64)

The present invention pertains to the catalytic reforming of petroleum naphtha. More specifically the present invention relates to a new and improved method of operating a multiple bed catalytic reforming system. Particularly the instant invention provides a method of stabilizing temperature conditions in a reactor of such a system as the reactor is brought into the reforming cycle subsequent to regeneration of its catalyst.

In the reforming of hydrocarbons, particularly straight run naphtha fractions, using for instance a platinum group metal-alumina catalyst, various reactions occur such as isomerization, dehydrocyclization, dehydrogenation, and hydrocracking all of which lead to hydrocarbon products of increased octane ratings usually greater than about 80 to 85 RON (neat). After a period of use in such a system, however, the catalyst becomes gradually deactivated due to the deposition of coke particles on the surface of the catalyst and consequently a decrease in the octane values of the reformate product is observed. If the octane requirements imposed upon the particular system are to be continuously met, the catalyst must therefore be restored in activity with this usually being accomplished by various regeneration techniques involving the burning of carbon from the catalyst by contact with an oxygen-containing gas. In a multiple bed essentially adiabatic reaction system a plurality of fixed beds containing the reforming catalyst can be arranged for serial flow of the feedstock and in such a manner that the beds can be removed from the processing cycle, usually one at a time, and the catalyst regenerated without a break in the continuity of operation. Subsequently the regenerated bed can be placed on stream with another bed being removed to undergo regeneration in like manner. This procedure is particularly applicable to catalyst beds or reactors subsequent in line to the initial reactor, preferably the terminal reactor, in order to extend the length of the processing cycle since the catalyst in a subsequent reactor is more quickly deactivated than that in the preceding reactors. This deactivation is due to the maintenance of a higher average temperature in the subsequent reactor catalyst bed.

The reforming process can be conducted under the following conditions. The feedstock, for instance a straight run naphtha, is contacted with a reforming catalyst at about 875 to 975° F. and at about 100 to 500 p.s.i.g. pressure at a weight hourly space velocity (WHSV) within the range of about 0.5 to 5 and a hydrogen recycle ratio of about 4:1 to 12:1 moles based on the moles of naphtha feed. High severity reforming conditions are useful in giving products of exceptionally high octane, sometimes rating at least about 95 RON (neat) and include temperatures of about 900 to 975° F., and pressures of about 100 to 250 p.s.i.g. The catalyst employed can be a supported platinum catalyst and containing for instance about 0.1 to 1.5 percent by weight platinum, preferably from about 0.3 to 1.0 percent and the support can be alumina characterized for instance by high surface area and large pore size. Such catalysts can be conveniently prepared as described in U.S. Patents Nos. 2,838,444 and 2,838,445. When employing these reforming operations a plurality of adiabatic catalyst beds are usually provided, for instance, 3, 4, 5 or more in number, and the hydrocarbon feed can be preheated to the desired inlet temperature before entry into each succeeding catalyst bed.

In the usual manner of operating the effect of the overall endothermic reforming system causes an increasing average temperature in each successive reactor with a particularly high temperature in the terminal reactor. As a result the catalyst in each succeeding reactor will become partially deactivated in less time than the catalyst of the preceding reactors and in order to insure a high grade reformate the catalyst in the reactors is periodically regenerated. This is normally accomplished in a multiple bed system by for instance blocking out a reactor, which may be a so-called swing reactor while the remaining reactors are continued in their normal processing cycle. The blocked out reactor, in order to regenerate the catalyst contained therein, can be depressured and purged with an inert gas. After purging, a flow of free oxygen-containing regeneration gas is established, and regeneration initiated. The regeneration can be conducted at a temperature in the range of about 700 to 950° F. with the final stage being conducted at about 850° to 950° F. When the activity of the catalyst has been restored, i.e. the predominant portion of the carbon deposits is burned off, the oxygen flow is stopped and the inert gas flow started. The system can then be depressured and evacuated several times in order to insure complete oxygen removal. Prior to placing the reactor on stream again it is pressured with a hydrogen-rich gas from the recycle system and when operating pressures have been attained the block valves are opened, placing the unit in the reforming cycle. Subsequently another reactor can be treated in substantially the same manner.

While this procedure outlined above is also normal and conventional, it has been found that certain difficulties are encountered when placing the regenerated reactor back in the processing cycle at a position in the system following the initial reactor. Thus, it has been found that immediately after the reactor is returned on-stream after regeneration an accelerated demethylation reaction is initiated which is highly exothermic and results in a rapid and uncontrolled rise in the temperature of the catalyst bed, in some cases temperature can exceed about 1200 to 1500° F. Exposure of the catalyst to these temperature levels during repeated regeneration cycles can cause a rapid and permanent deactivation of the catalyst resulting from changes both in the alumina base (sintering, loss of area, etc.) and in the form of distribution of the active platinum on the catalyst.

Analysis of the conditions prevailing in the reactor at this point, i.e. when placing a regenerated reactor or catalyst bed back on stream, show that they are highly conducive to such an exothermic reaction. For instance, the high temperature levels prevailing from the regeneration, e.g. usually at least about 700 or 800° F. to 950° F. high hydrogen partial pressure, low hydrocarbon space velocity conditions at the time flow is resumed and the quality of the effluent available from the upstream reactor all assist in adding to the difficulty. In particular, it is the quality of the effluent entering the regenerated reactor which poses the primary reason for such exothermic condition in as much as it is already partially reformed, i.e. the dehydrogenation of naphthenes to aromatic has been substantially conducted. This is shown by an analysis of the effluent from two typical reforming operations.

*Four reactor system*

|  | Paraffins, Mols/100 Bbls. Feed | Naphthenes, Mols/100 Bbls. Feed | Aromatics, Mols/100 Bbls. Feed |
| --- | --- | --- | --- |
| Component Composition—Feed Naphtha | 115.9 | 103.5 | 18.6 |
| No. 1 Reactor Effluent | 117.5 | 65.2 | 54.1 |
| No. 2 Reactor Effluent | 118.5 | 36.9 | 78.4 |
| No. 3 Reactor Effluent | 117.4 | 25.1 | 86.6 |
| No. 4 Reactor Effluent | 113.0 | 16.1 | 93.1 |

*Five reactor system*

|  | Paraffins, Mols/100 Bbls. Feed | Naphthenes, Mols/100 Bbls. Feed | Aromatics, Mols/100 Bbls. Feed |
| --- | --- | --- | --- |
| Component Composition—Feed Naphtha | 111.1 | 97.9 | 26.9 |
| No. 1 Reactor Effluent | 111.6 | 37.7 | 84.5 |
| No. 2 Reactor Effluent | 106.2 | 7.6 | 114.2 |
| No. 3 Reactor Effluent | 60.7 | 2.4 | 134.1 |
| No. 4 Reactor Effluent | 28.7 | 1.6 | 145.2 |
| No. 5 Reactor Effluent | 13.0 | 1.1 | 150.1 |

As shown by the data above which is a generally representative system, the net result is to have reduced amounts of naphthenes entering the reactors subsequent to the initial reactor and substantially only very few naphthenes present at the entrance of the terminal reactor when placed on stream. Consequently the hydrocracking of the paraffins, an exothermic reaction, becomes the predominate reaction with relatively little or no dehydrogenation of naphthenes, an endothermic reaction occurring. This situation of course will lead to an immediate and noticeable increase in temperatures.

Now in accordance with the instant invention, I have provided a particular method of operating such a multiple bed reforming system so that the uncontrolled temperature increases in a reactor being placed back on stream behind (flow-wise) to the initial reactor and after regeneration can be controlled or avoided and consequently the catalyst life and activity can be prolonged. The method of the instant invention provides fresh naphtha feed at the inlet side of the reactor coming back on stream along with the effluent from the upstream reactor, the fresh feed being supplied for a time sufficient to provide for the attainment of normal feedstock space velocities and hence stable reforming conditions and thereafter discontinuing the supply of fresh feed. In effect, the purpose of this supply of fresh feed is to increase the hydrocarbon space velocities at the instant the reactor enters the processing cycle and thereafter as the effluent space velocity builds up to normal operating levels the supply of fresh hydrocarbon feed can be discontinued. Additionally as indicated previously the fresh feed having high percentages of naphthenes therein will undergo an endothermic reaction, thus aiding in the withdrawal of heat from the exothermic hydrocracking reaction. The amount of fresh feed supplied to the reactor will depend upon various factors such as catalyst distribution arrangements, stock types, operating severities, etc. However, in general the fresh feed will be supplied in amounts of about 2.0 to 20.0 volume percent based on the total unit fresh feed, preferably it will be about 2 to 10 volume percent, and the amount of fresh feed supplied will be sufficient to give temperatures not materially above about 1000° F. The fresh feed will be continued until such time as normal processing conditions can be reestablished. Thus this time will be dependent upon factors such as catalyst bed temperature, WHSV of the effluent from the upstream reactor, and composition of the upstream effluent and fresh feed. Generally, the naphtha feed will contain about 25 to 75% paraffins, preferably about 35 to 60%, about 15 to 65% naphthenes, preferably about 25 to 55% and about 5 to 20% aromatics, volume percent basis. The effluent from the reactor immediately preceding the reactor coming back on-stream will usually contain about 30 to 60% paraffins, about 2 to 15% naphthenes and about 20 to 65% aromatics, volume percent basis.

In order to describe more fully the method of the present invention reference is made to the accompanying drawing wherein is shown in schematic form a multiple bed reforming system employing four reactors arranged for series flow in any order desired. The feedstock, for instance a straight run naphtha, enters the system as through line 1, pump 2 and line 3 and passes to preheater 4. From the preheater 4 the fresh feed flows by way of line 5 to inlet header 6 which is arranged to form a parallel connection between the four reactors 7, 8, 9, 10, each containing a fixed bed of platinum-alumina reforming catalyst, by way of valves 11, 12, 13, 14, 15 and 16 and lines 17, 18, 19 and 20. As here shown valves 12, 14 and 16 are closed so that the feed from preheater 4 will flow from line 5 through open valve 11 and line 17 to reactor 7. From reactor 7 the effluent will pass via line 21 to outlet header 22 also communicating with units 8, 9 and 10 by means of lines 23, 24 and 25 and valves 26, 27, 28, 29, 30, and 31. As here shown valves 27, 29 and 31 in header 26 will be closed so that the effluent from reactor 7 will flow through valve 26 and line 32, interposed between valves 26 and 27, to preheater 33 in which the temperature of the effluent can be again raised to the inlet temperature of the reactors. From heater 33 the effluent passes to reactor 8 by way of line 34, valve 13 and line 18. The effluent from reactor 8 passes by way of line 23 to the outlet header 22, and to the third preheater 35 by way of open valve 28 and line 36. From heater 35 the effluent passes to the third and final reactor 9 in the processing cycle by means of line 37, valve 15 and line 19 from whence it is withdrawn by means of line 24 and valve 30, passing from the reforming system through line 38. If desired the reformate from the system can be led to heat exchanger 39 wherein it passes in heat exchange relationship with the incoming feedstock in line 1 and thence the reformate can be further treated in any conventional manner. For instance, it can be passed to flash drum 39a for removal of hydrogen and light hydrocarbon gases.

The reforming system is provided with a catalyst regeneration system with each of the multiple reactors being connected in the regeneration system in a manner such that any one reactor can undergo regeneration without an interruption of the normal reforming cycle. Thus there is provided inlet manifold 41 having valves 42 and 43 for the ingress of regeneration oxygen-containing gases or inert purge gas, e.g. nitrogen, from system 61 and each of the reforming units 7, 8, 9 and 10 is connected to the manifold 41 by means of line 44 and valve 45, line 46 and valve 47, line 48 and valve 49, line 50 and valve 51, respectively. The regeneration gases are taken from the reactors by means of outlet manifold 52 in communication with each of the respective reactors via line 53 and valve 54, line 55 and valve 56, line 57 and valve 58, and line 59 and valve 60. As schematically shown the inlet and outlet manifolds 41 and 52 lead to the regeneration system 61. As further shown, means are provided to evacuate each of the reactors by way of valve 68 and line 69 upon completion of the regeneration cycle. Hydrogen-rich recycle gas is provided to the system via line 70 leading from the flash drum and branch lines 71 and 72 leading from compressor 66.

Excess hydrogen-rich gas can be withdrawn via line 73 when desired. The free hydrogen gas in line 72 passes into the feedback while the hydrogen gases in line 71 pass by way of the regeneration manifolding system to any given reactor in order that the reactor after regeneration can be brought to operating pressure before being brought back on-stream.

The system described thus far is more or less conventional in such a multiple unit reforming system and its operation can be described as follows. Assuming that the fourth unit, i.e. unit 10, is separated from the reaction system and undergoing regeneration and the other three reactors are on stream, valves 11, 26, 13, 28, 15 and 30 will be open and the remaining valves in the series of the three reactors will be closed, i.e. valves 27, 12, 29, 14, 31 and 16. Thus, the feedstock will enter the system at 1 pass through charge pump 2, mingle with recycle hydrogen-rich gas from line 72 and pass in a serial manner through the three reactors 7, 8 and 9, after passing through the heaters 4, 33 and 35 positioned respectively before each of the reactors. The reformate from reactor 9 will pass out of the system via line 38 to flash drum 39a and to reformate stabilizer (not shown). Hydrogen-rich recycle gas can be recovered from the flash drum and returned to the system via lines 72 and 71.

The deactivated catalyst of the fourth reactor, i.e. that of unit 10, can undergo regeneration in the normal manner; see for instance Johnson et. al. application Serial No. 512,334, filed May 31, 1955, now U. S. Patent No. 2,922,766, herein incorporated by reference for a prefered method of operation. The deactivated catalyst remains regenerable as the nature of the deactivation is not permanent even though upon regeneration the activity of the catalyst may not be restored to that of the virgin catalyst. Thus, the catalyst might be referred to by some as being partially deactivated. By opening valves 42 and 60 the initial purge gases, the oxygen-containing burning gases, gases of combustion and the final purge gases can be supplied and/or withdrawn from reactor 10. Evacuation of the purge gases from the reactor is accomplished by closing valve 42 and opening valves 60 and 68. Prior to placing the reactor back on stream it is pressured with hydrogen-rich recycle gas by closing valves 42, 60 and 69 and opening valves 43 and 51, valves 45, 47 and 49 being closed. When the reactor attains operating pressure valve 31 is opened to establish a flow of hydrogen-rich recycle gas through the system. At this point normal flow of effluent from the preheater 35 can be established through reactor 10 by opening valve 16 and, if desired, closing valves 15 and 30 so as to block unit 9 from the reforming cycle in order to effect its regeneration if necessary or desired.

It is at this point that I have found uncontrolled temperature runaway conditions will often prevail in the reactor being returned to the processing cycle. By the instant invention, however, this difficulty can be obviated and the catalyst bed in reactor 10 can be maintained at the desired temperature level. This is accomplished by introducing into reactor 10 in controlled amounts, along with the effluent from the upstream reactor 8, fresh naphtha feedstock. In order to accomplish this result I have slightly modified the above-described system in order to provide means to introduce directly fresh feedstock to each of the reactors in the system on a selective basis. Thus there is provided fresh feed manifold 73 in communication with each of the reactors 7, 8, 9, and 10 by means of line 74 and valve 75, line 76 and valve 77, line 78 and valve 79 and valve 80, respectively. The auxiliary fresh feed can enter the system by way of circuit 81, preheater 82 which brings the naphtha to reaction temperature and line 83. As here shown the auxiliary feed manifold can join with the primary feed line 3 and a check valve 84 can be interposed between this juncture and the point where line 83 joins manifold 73 to permit flow through preheater 82 even when the auxiliary fresh feed is not passing directly to any one of the reactors.

When operating in accordance with the present invention the start up procedure as outlined above for bringing the regenerated reactor back on stream will be modified in accordance with the following method. After regeneration, purging and hydrogen-rich gas recycle has been established by closing valves 42, 60 and 69 and opening valves 51 and 31, the virgin, i.e. auxiliary fresh feed-stock flow is started to the reactor 10 by opening valve 80 while maintaining valves 75, 77 and 79 in the closed position. Upon opening valve 80 the fresh feed is diverted to manifold 73. Valve 84 need not be closed but will act as a check valve to prevent backflow of naphtha from the main fresh feed line 3.

When the fresh naphtha flow to reactor 10 is started, and the naphthene dehydrogenation reaction is proceeding as shown by a temperature drop in the catalyst bed, reactor 10 can be safely brought back into the processing cycle by opening valve 16 to allow the effluent from the upstream reactor 8 to flow directly to reactor 10 after passing through heater 35. At this point reactor 9 can be taken off stream by closing valves 15 and 30 and subsequently this reactor can also be regenerated and brought back on stream in the manner described above. It is, of course, feasible simultaneously to initiate introduction of the fresh feed and the effluent into the reactor although the above operation is preferred.

When conditions have been reestablished in the reactor permitting normal stable operation without increase of temperature, the fresh feed can be discontinued by closing valve 80. Thus, as the effluent WHSV is gradually returned to normal, the fresh feed introduction can be gradually terminated and when the desired levels are attained the fresh feed can be discontinued entirely without danger of run-away temperature.

The time sequence together with actual flow rates for the introduction of the fresh feed directly into the regenerated reactor are primarily a function of the reactor system under consideration including such items as effluent composition, position of the regenerated reactor in the system, the number of reactors in the system and the particular bed temperature at the moment of bringing the reactor back on stream. In general, however, the fresh feed can be introduced in an amount sufficient to maintain normal or near normal reforming temperatures, e.g. about 875° F. to 1000° F. and for a period of time sufficient to attain a WHSV of effluent of about 0.5 to 5.

In order to illustrate the effectiveness of the instant method the following situations can be enumerated. They are not, however, to be considered as limiting the scope of the present invention. Thus, in a typical five reactor system operating to produce a reformate of 90+ octane value from a straight-run naphtha fraction at reactor inlet temperatures of 900° F., 350 p.s.i.g., 1.3 WHSV and 7.5 to 1 $H_2$ to hydrocarbon mole ratio, the terminal bed after regeneration attained a temperature of about 1400° F. as a result of rapidly increasing demethylation as the terminal reactor was being put back on stream by slowly opening the block valve. The bed temperature was decreased to normal operating temperatures, i.e. about 900° F., in a period of about five minutes by adding fresh naphtha, along with the effluent from the upstream reactor, at a rate of about 5.9 volume percent. If, however, the bed temperature had reached only about 1200° F. the fresh naphtha addition rate would have been proportionally lower, for instance, about 3.3 volume percent. On the other hand, when run-away temperature conditions exist at the No. 3 reactor being brought back on stream after regeneration and the temperature reaches about 1400° F. only 4.7 volume percent of fresh naphtha is needed to lower the temperature to normal operating levels whereas if the temperature attained about 1200° F., about 2.2 volume percent would be necessary. The lower rates in the case of the number 3 reactor are explainable, of course, on the grounds that the naphthene concentration is higher at the inlet of number 3 reactor than at the inlet of the number 5 reactor and thus less fresh naphtha is required to counterbalance the endothermic dehydrogenation reaction and the exothermic cracking reaction. Analysis of the conditions existing in any of the other reactors in the system would produce proportionately the same results.

I claim:

1. In a method for operating a multiple bed catalyst reforming system to produce high octane hydrocarbons, in which a deactivated catalyst bed is regenerated, the steps which comprise maintaining a flow of naphtha through the system while the system is under reforming conditions including a temperature of about 875 to 975° F., removing a reactor from the system after the catalyst therein has become deactivated, regenerating the catalyst in said reactor, and placing said reactor back on stream at a position subsequent in flow to the initial reactor while introducing to said reactor containing the regenerated catalyst sufficient naphtha along with effluent from the upstream reactor to give a temperature not exceeding about 1000° F. to establish stable reforming conditions.

2. The method of claim 1 in which the naphtha passing to the reactor coming back on stream is about 2 to 20% of the naphtha charged.

3. The method of claim 2 in which the reactor coming back on stream is in the terminal position.

4. The method of claim 3 in which the catalyst is a platinum-alumina reforming catalyst.

5. In a method for operating a multiple bed catalyst reforming system to produce high octane hydrocarbons, in which a deactivated catalyst bed is regenerated, the steps which comprise feeding naphtha containing about 25 to 55 percent naphthenes to the initial reactor of the system while the system is under reforming conditions including a temperature of about 875 to 975° F., removing a reactor from the system after the catalyst therein has become deactivated, regenerating the catalyst in said reactor, and placing said reactor having a temperature of about 700 to 950° F. back on stream at a position subsequent in flow to the initial reactor while introducing to said reactor containing the regenerated catalyst sufficient naphtha containing about 25 to 55 percent naphthenes along with effluent from the upstream reactor containing about 30 to 60 percent paraffins, about 2 to 15 percent naphthenes and about 20 to 65 percent aromatics to give a temperature not exceeding about 1000° F. to establish stable reforming conditions.

6. The method of claim 5 in which the naphtha passing to the reactor coming back on stream is about 2 to 20 percent of the naphtha charged.

7. The method of claim 6 in which the catalyst is a platinum-alumina reforming catalyst.

References Cited in the file of this patent
UNITED STATES PATENTS

| | | |
|---|---|---|
| 2,773,014 | Snuggs et al. | Dec. 4, 1956 |
| 2,865,837 | Holcomb et al. | Dec. 23, 1958 |
| 2,885,351 | Johnston | May 5, 1959 |